United States Patent [19]

Flemming

[11] Patent Number: 4,628,396
[45] Date of Patent: Dec. 9, 1986

[54] HIGH VOLTAGE DISCONNECT/RECONNECT SWITCHING DEVICE

[75] Inventor: D. Frank E. Flemming, East Spanaway, Wash.

[73] Assignee: The United States of America as represented by the Secretary of the Air Force, Washington, D.C.

[21] Appl. No.: 672,239

[22] Filed: Nov. 16, 1984

[51] Int. Cl.[4] .................................................. H02H 3/20
[52] U.S. Cl. ...................................... 361/91; 361/115; 361/117; 200/144 AP; 340/659; 340/662
[58] Field of Search ................... 361/6, 71, 91, 115, 361/117; 307/140; 200/144 R, 144 AP; 340/659, 662

[56] References Cited

U.S. PATENT DOCUMENTS

| | | | |
|---|---|---|---|
| 1,819,245 | 8/1931 | Jones | 361/111 |
| 3,238,475 | 3/1966 | DeVita et al. | 464/56 |
| 3,317,650 | 5/1967 | Padellford | 147/5 |
| 3,639,712 | 2/1972 | Balmat et al. | 200/144 AP X |
| 3,891,893 | 6/1975 | Thaler | 361/3 |
| 3,973,224 | 8/1976 | Gaule et al. | 361/91 X |
| 4,069,406 | 1/1978 | Meinders | 200/144 AP |
| 4,245,184 | 1/1981 | Billings et al. | 323/235 |
| 4,293,886 | 10/1981 | Church et al. | 361/71 |
| 4,348,709 | 9/1982 | Mauk et al. | 361/92 |
| 4,368,499 | 1/1983 | Stifter | 340/662 X |
| 4,536,659 | 8/1985 | Seitz et al. | 307/140 X |

Primary Examiner—A. D. Pellinen
Assistant Examiner—Derek S. Jennings
Attorney, Agent, or Firm—Bernard E. Franz; Donald J. Singer

[57] ABSTRACT

The apparatus comprises a high voltage disconnect and load isolation switch. During normal operation commercial power is conducted through a pair of contacts "a" and "b" to a load. When a high voltage (HV) component is detected by an HV pulse detector, a command from the HV detector opens a secondary power interrupter while simultaneously activating the opening of contacts "a" and "b". A surge protector conducts some of the HV energy greater than the source, or commercial power, to ground. As contacts "a" and "b" open, HV ground probes are positioned at a slight distance (dielectric constant equal to the commercial power source) from these contacts. These probes provide a ground source for an HV component throughout the complete transition of contact "b" to the rest position, which will be at ground potential. There is now full isolation from the source power supply.

5 Claims, 9 Drawing Figures

HIGH VOLTAGE DISCONNECT/RECONNECT SWITCHING DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to a high voltage disconnect/reconnect isolation switching device between a commercial power source and a facility/installation load.

Difficulty has been experienced in providing prompt and positive disconnect, isolation of commercial power at high voltage (69-138 KV or greater) to special facilities, with subsequent reconnectability. This problem arises from the inability to handle the high voltage problem created by a nuclear detonation and assumed to be approximately 50 coulombs or greater, during a switching off line sequence, resulting in damage to switching and internal electrical equipment.

The prior art includes U.S. Pat. No. 4,245,184 to Billings et al which discloses a solid-state circuit breaker for controlling the supply of power from an AC supply to a load which includes circuitry for permitting off/on/reset operations actuated be a mechanical toggle control switch wherein the control switch opens essentially all of the circuitry between the source and the load. U.S. Pat. No. 3,891,893 to Thaler discloses a high-voltage power switch embodying at least two power switch locations having each terminal or pole connected in series. U.S. Pat. Nos. 3,317,650, 4,348,709, 1,819,245, and 3,238,475 disclose a variety of overload protection circuits of general interest.

SUMMARY OF THE INVENTION

An object of the invention is to provide prompt and positive disconnect and isolation of commercial power to a facility, without sustaining serious damage to the facility equipment and high voltage gear during a switching off sequence, with the ability for auto or manual subsequent reconnect.

The apparatus according to the invention comprises a high voltage sense and load disconnect device. During normal operation commercial power is conducted through a redundant set of contacts "A" and "B" to a load. When a high voltage (HV) component (as may be present from a nuclear blast) is detected by an HV pulse detector, a command from the HV detector opens a secondary power interrupter while simultaneously activating opening the contacts of a special high voltage switch. A carry through uniterrputed power supply source provides temporary power during the switching sequence. A surge protector conducts some of the HV energy greater than the source, or commercial power, to ground. As contacts of the special high voltage switch open, HV grounding probes are positioned at a slight distance (dielectric constant equal to the commercial power source, approximately 69-138 KV) from the moving contacts. These probes provide a direct ground path for the extremely high voltage component throughout the complete transition of the contacts to the rest position, which is at ground potential. There is now full isolation from the commercial power supply, the extremely high voltage component and the system or facility load. Additional blocking capacitive/inductive devices provide suppresion to often damaging radio frequency (RF) components on the line created by the opening of the high voltage switch contacts. The high voltage pulse detector (HVPD) will continue to monitor and provide status for reconnect.

DETAILED DESCRIPTION

Figure 1:
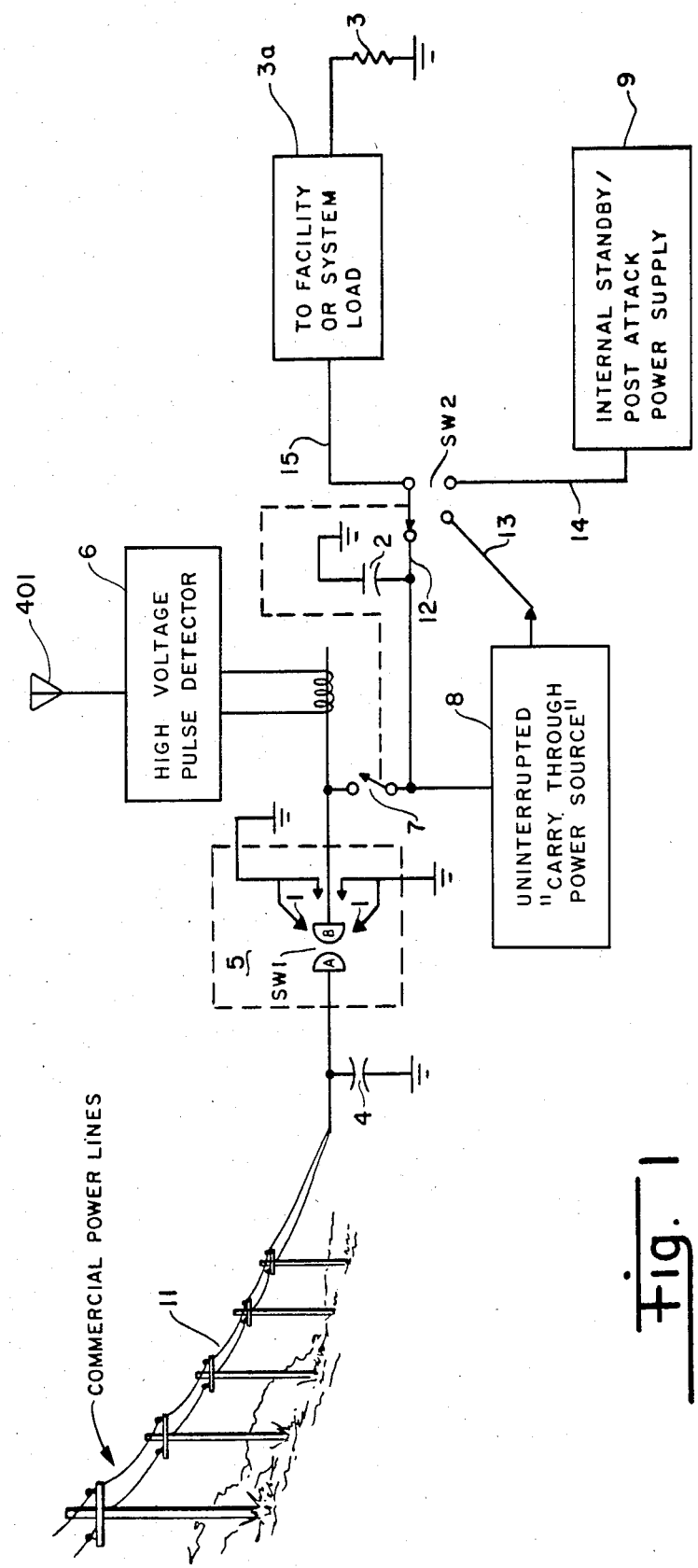
FIG. 1 is a diagram of a high voltage disconnect/reconnect system configuration showing the invention.
Figure 1A:
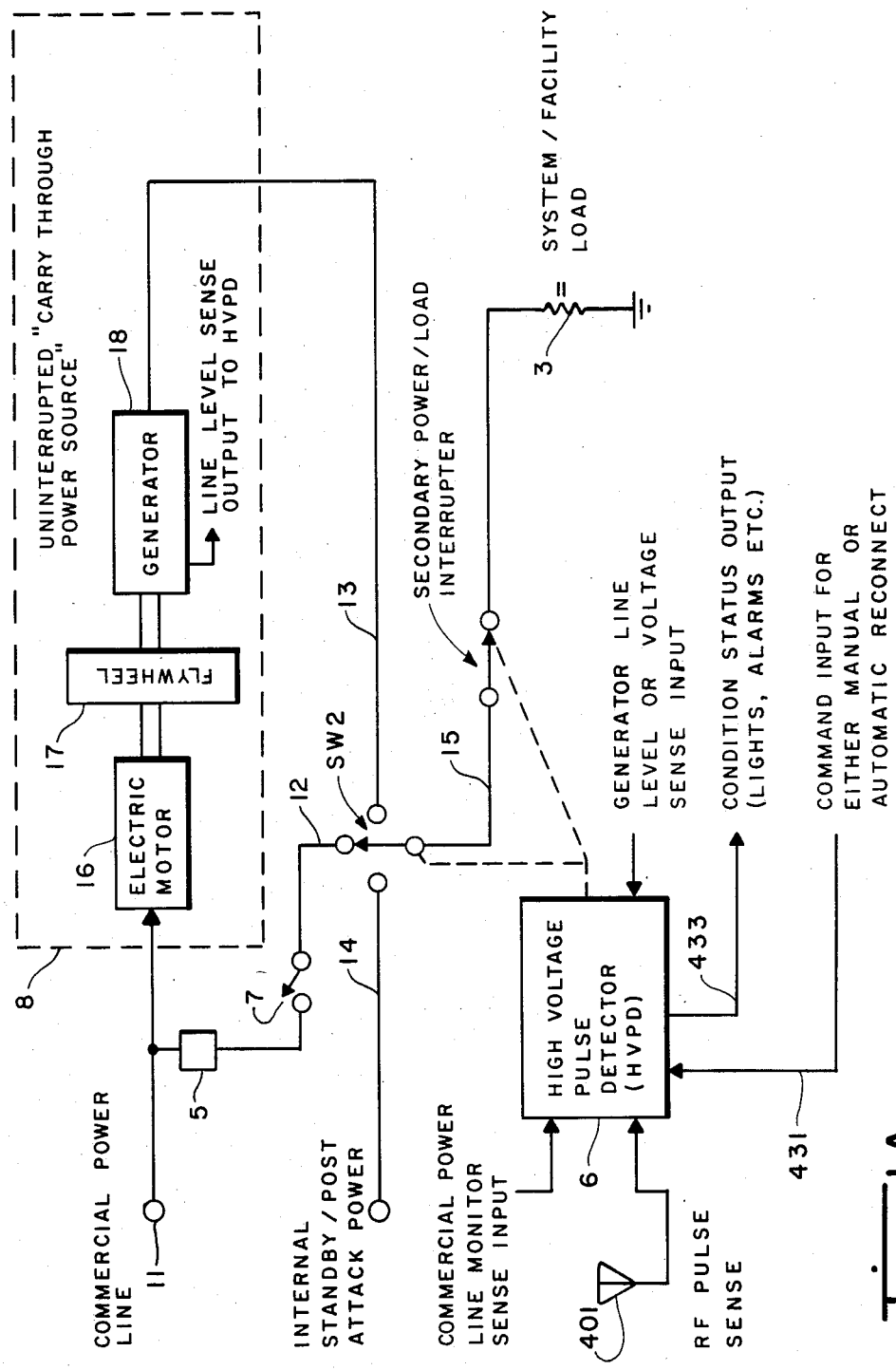
FIG. 1A is a block diagram showing additional aspects of the disconnect/reconnect system.

Referring to FIG. 1, the high voltage disconnect/reconnect system configuration includes the following;

1. Grounding probes.
2. Radio frequency interference (RFI) filters.
3. Facility/system load (coupled via apparatus shown as block 3a).
4. Extremely high voltage surge protector.
5. Special high voltage disconnect/reconnect switch (SW1)
6. High voltage pulse detector (HVPD).
7. Secondary load interrupter—slaved/linked to HVPD.
8. Uniterrupted "carry through power source".
9. Internal standby/post attack power supply.
10. Source select switch (SW2)—operated by HVPD.

The source 11 may be commercial power at 69-138 KV or greater. The load shown as a resistor 3 represents the electrical apparatus of a facility. The prime facility power interrupt switch SW1 (FIG. 2D) comprises contacts A and B. This switch has a special enclosure 5 of existing design which is either vacuum or of other special nonconducting environment enhancing a stable dielectric while reducing contact material burn or failure.

Figure 2:
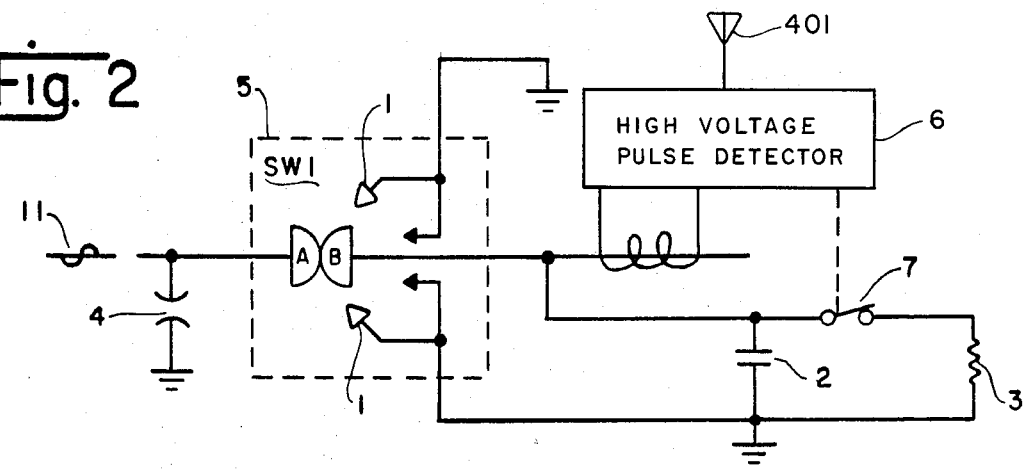
FIGS. 2, 2A and 2B are block and schematic drawings of the apparatus of FIG. 1, at different stages of operation.

In normal operation, the switch SW1 is closed, as shown in FIG. 2.

Figure 2A:
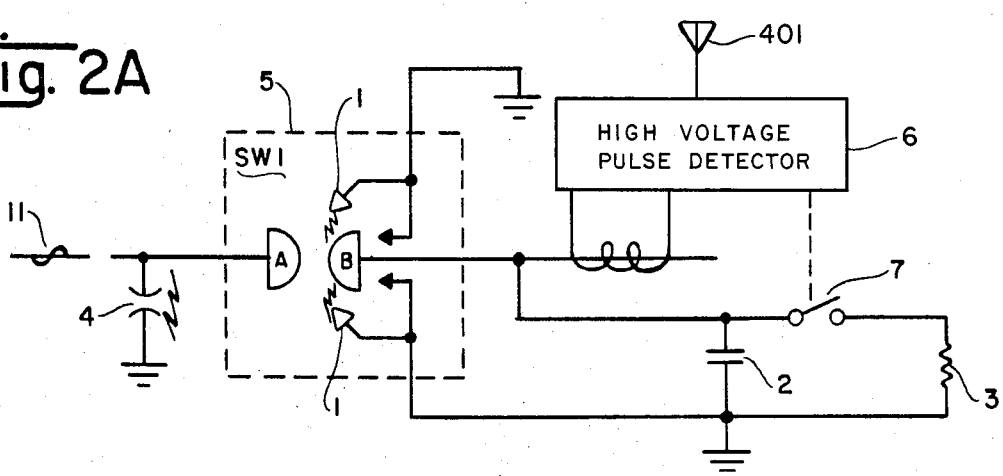

In the prior arrangement, upon detection of a high voltage surge, such as would be caused by a high altitude nuclear blast (HAB), the switch SW1 would open (FIG. 2A), turning off or isolating commercial power from the facility with simultaneous switchingover to emergency site power. However, the high voltage component from the surge would also be on the commercial power line, seeking ground (in this case through/via the facility, with damaging results to both equipment and personnel) and would conduct across the opening contacts of the switch SW1 (SW1 open transistion period) until a space "$d_1$" was of sufficient distance to support a balanced dielectric. In reality, such an operation poses two problems: (a) the transition time of the switch SW1 or load interrupt is mechanically too slow to eliminate or significantly reduce arc over at points of contact, and there may be limitations for reconnect to commercial power service, (b) high voltage/frequency component suppression is present until adequate dielectric is achieved.

Figure 2B:
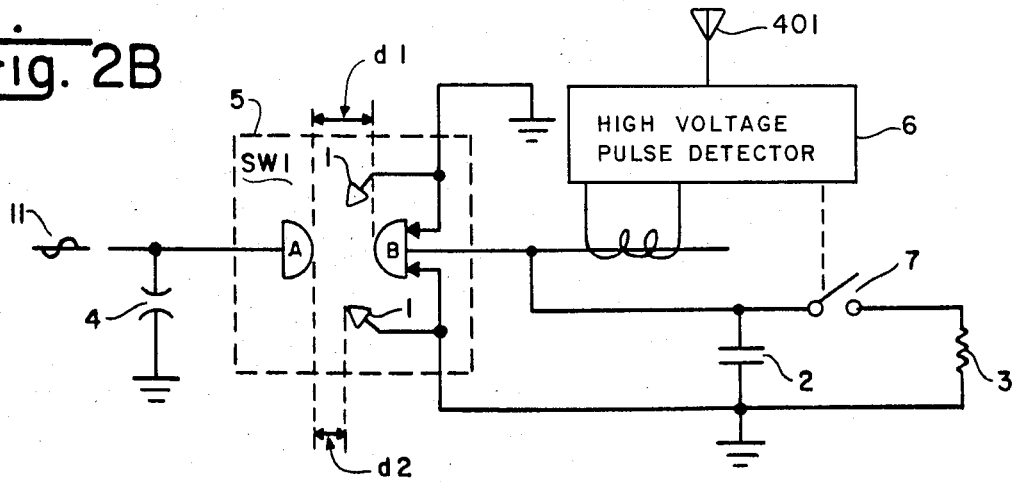
Figure 2C:
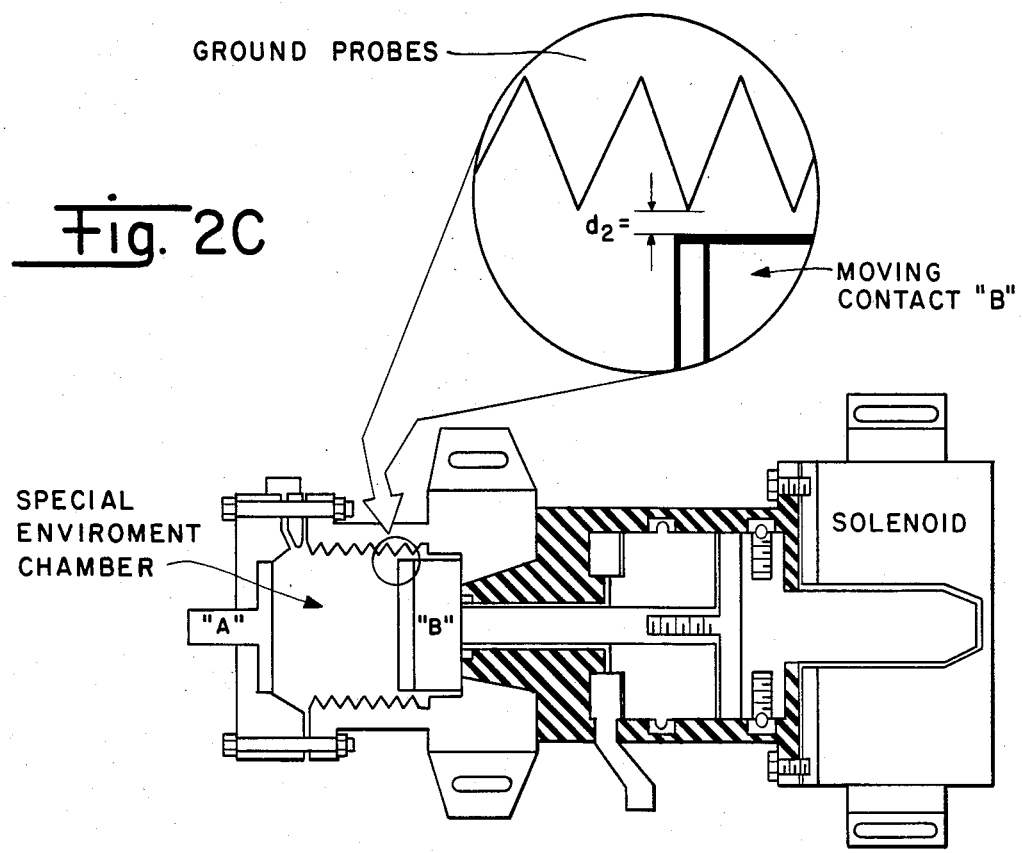
FIG. 2C is a view, partly sectioned, of the switch SW1, with an expanded view of a portion thereof to show the dielectric constant "$d_2$"
Figure 2D:
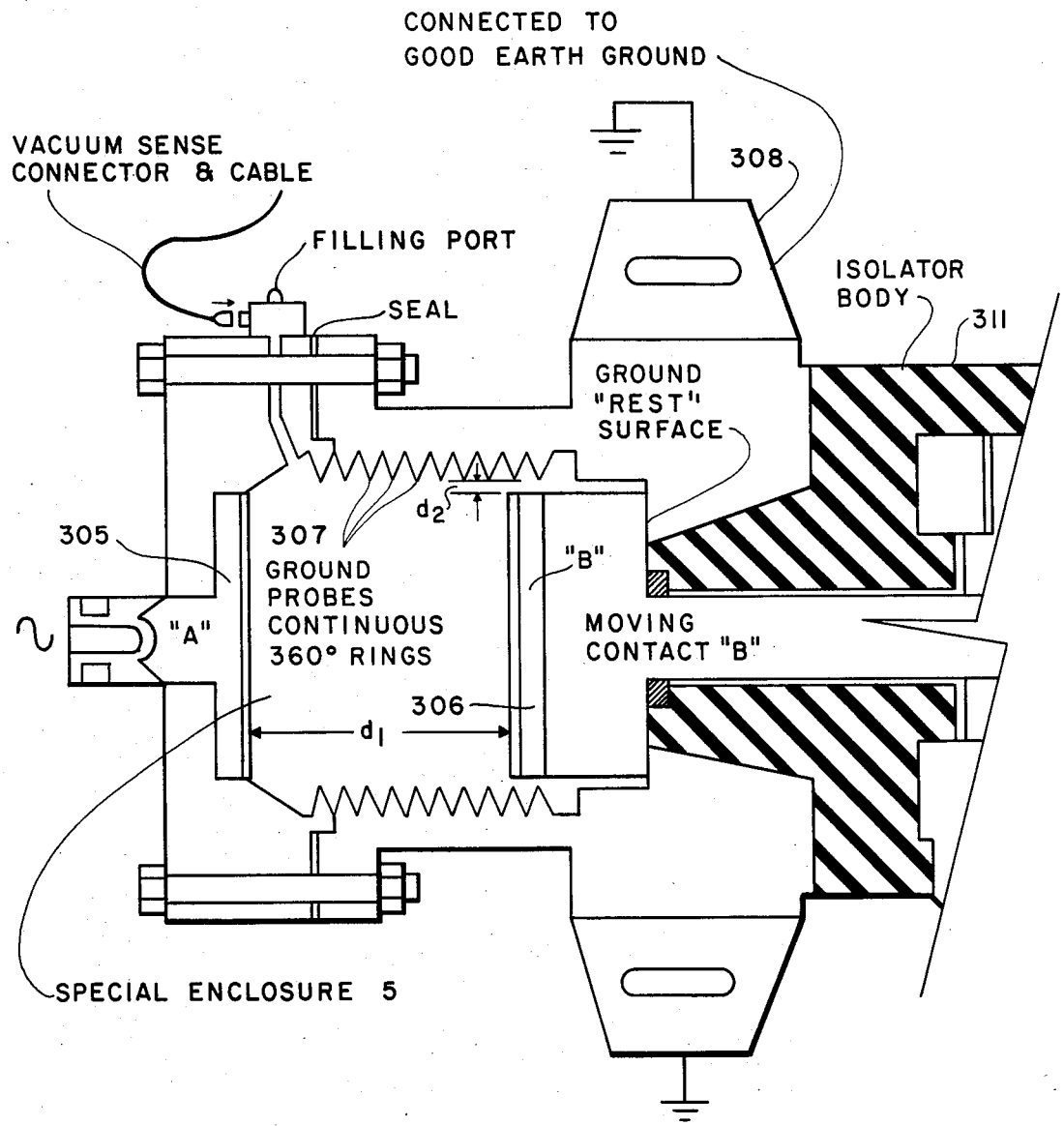
FIG. 2D is a view, partly sectioned, of the switch assembly SW1 (shown in open/off position)

The prime feature of the invention is the use of grounding probes 1 positioned at a dielectric distance d2 equal to the power line voltage (FIG. 2C), which is slightly behind moving contact B (FIGS. 2C and 2D). During the "off" transition cycle, contact B, following the breakaway from fixed contact a, will move closer to, and pass by the ground probes. The purpose is to provide a continuous bypass to ground of high voltage energy greater than the power line source voltage, at breakaway, and during complete transition of the contact B. The grounding probes 1 contained inside the special enclosure 5 are conical shaped, with tapered ends positioned toward contact b as mentioned above. (See FIG. 3) The invention also physically places moving contact B at ground potential when off (FIG. 2B). A positive mechanical (or electrical) interlock, linked with/to moving contact B opens a high voltage feed interrupter 7 to provide complete isolation between the source and the load.

Figure 3:
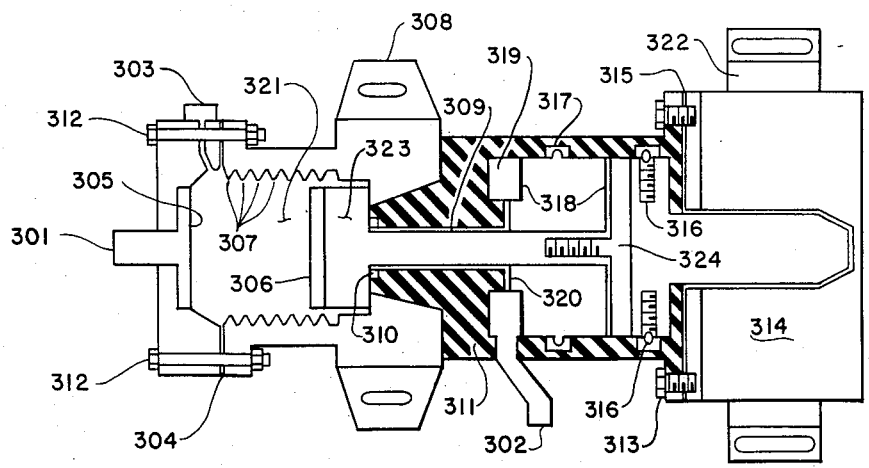
FIG. 3 is another view, partly sectioned, of the high voltage load interrupter mechanism including switch SW1.

Referring to FIG. 3, the high voltage load interrupter, which includes the switch SW1, comprises:
301. Unswitched input stud.
302. Switched input stud.
303. Vacuum of special environment port and monitor sensor.
304. Front section seal.
305. Contact plate "A", primary switch contact.
306. Contact plate "B", primary switch contact.
307. Ground probe surface cones.
308. Mounting contact and primary ground contact.
309. Plunger casing and lubricant.
310. Top plunger seal.
311. Insulator body and subcarrier casing.
312. Front section case bolts.
313. Rear section case bolts.
314. Solenoid.
315. Rear section seal.
316. Locking ball, coil spring and upper case lock assembly.
317. Lower case lock assembly.
318. Secondary contact surface.
319. Secondary contact plate mount.
320. Upper plunger seal.
321. Special environment chamber.
322. Solenoid mounting bracket.
323. Plunger (moving contact "B").
324. Threaded plunger buffer plate and moving secondary contact carrier.

OPERATION

The problems are solved sequentially by the application of both passive and active components. During normal operation (FIG. 2), commercial power from the source is conducted through the high voltage surge protector 4, and through contacts A and B to the load. When a high voltage component is detected (FIG. 2A) by a high voltage pulse detector in unit 6, a command from the HV sensor opens secondary prime & subsystem power interrupters 7, while simultaneously activating the opening of contacts A and B. It should be noted that the physical distance and switching sequence of the secondary power interrupters can be appreciated in the isolation of the HAB electro magnetic interference (EMI) effects, where a slight delay of the EMI pulse leading edge can be expected. Note that the surge protector 4 conducts some of the high voltage energy greater that the source, or commerical power to ground. As contacts A and B open, high voltage ground probes 1 are positioned at a slight distance (dielectric constant equal to commercial power source) from the contacts. At a distance slightly greater than the elementary length of the charge path for the primary source power, there is provided a ground source for the surge high voltage component throughout the complete transition of contact B to the rest position, which will be at ground potential. In the full isolate position (FIG. 2B) contact B is grounded where d1 is greater than d2, and d1 is approximately sufficient dielectric for recurring surge high-voltage components. The facility is now fully isolated from the source power supply. Note: Manual command can be used to reconnect the facility load to the source power.

Figure 4:
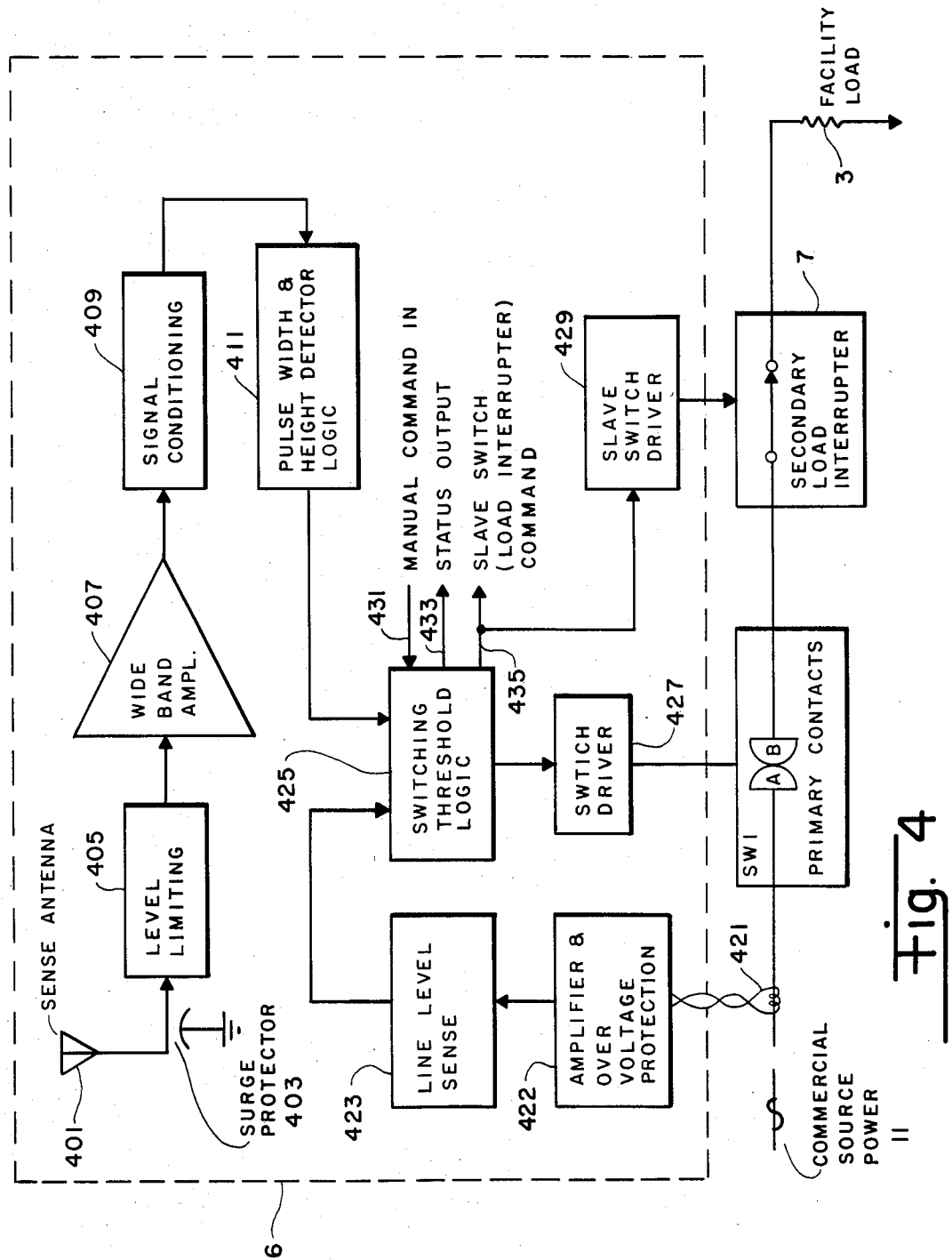
FIG. 4 is a block diagram of the high voltage sense/detector and control system.

The high-voltage sensor/detector (HVPD) unit 6, as shown in FIG. 4, comprises an antenna 401 for detecting an R.F. signal produced by a high altitude blast. The signal is supplied via a surge protector 403 to a level limiting circuit 405, and thence via a wide band amplifier 407, a signal conditioning unit 409, and a pulse width & height detector logic unit 411. Another input for unit 6 comprises a sense coil 421 at the commercial power source line 11. Any signal detected by the coil 421 is supplied to an amplifier and over-voltage protection unit 422, and then to a line level sense unit 423. Signals from units 411 or 423 are supplied as inputs to a switching threshold logic unit 425. The principal output from unit 425 is to a switch driver 427, which operates the solonoid 314 (FIG. 3). The unit 425 also has an input line 431 for manual commands, a status output line 433, and slave switch output line 435. The signal on line 435 is used to control a slave switch driver 429 for the secondary load interrupter 7.

CONCLUSION

It should be noted that the prime purpose of my invention is:

(1). Application of grounding probes 360° about the moving contact "B", providing a continuous uninterrupted ground path in/within a special low or non conductive enviroment until the moving contact stops and rests at ground potential.

(2) Multiple series switch out delay with "last in, last out" method. (i.e. for example upon detection of the high voltage pulse - greater than the power line voltage, the power interrupter or switch (#7 in FIG. 1) closest to the equipment or facility, with adequate physical distance from the primary power switch, would be opened first, with a very slight delay, then the primary switch (contacts "A" and "B").

(3) Use of series surge protectors (#4 in FIG. 1) and radio frequency filters (#2 in FIG. 1) intergral to protect switching assembly.

(4) Ability to reconnect after disconnect - please note the actuation unit (#314, FIG. 3) can be any motive power unit—i.e. —electrical solenoid—explosive squib etc.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

I claim:

1. A high-voltage power switch arrangement for use with a power source with power supplied via feed lines comprising:

primary contacts including a fixed contact and a moving contact located within an enclosure having a vacuum or other special nonconducing environment, said contacts being normally closed to connect a power source to a load, probe means located within said enclosure positioned at a probe dielectric distance approximately equal to the normal source voltage, which is slightly behind the moving contact, the probe means being connected to ground, the moving contact having an open rest position in which it is connected to ground, a high-voltage pulse detector for detecting abnormal high-voltage components, actuator means electrically coupled to the high-voltage pulse detector and mechanically coupled to the moving contact;

operative in response to the detection of a high-voltage component by the high-voltage pulse detector to operate the actuator means to move the moving contact from the closed position to the open rest position, with the probe means providing a ground path for the extremely high electrical energy component, induced onto said feed lines, and greater than the source voltage, throughout the transition of the moving contact to the open rest position, where it is grounded, this being an open full isolate position.

2. The arrangement according to claim 1, wherein said probe means comprises at least two cone-shaped probes having tapered ends positioned toward the fixed contact.

3. The arrangement according to claim 1, further including a surge protector connected from said source to ground which conducts some of any abnormal high-voltage energy to ground, and a secondary power interrupter connected between the fixed contact and the load, the high-voltage pulse detector being coupled to the line between the primary contacts and the secondary power interrupter, said actuator means also being operative to open the secondary power interrupter at the same time as said moving contact.

4. The arrangement according to claim 1, wherein said probe means comprises two cone-shaped probes having tapered ends positioned toward the fixed contact, where in the open full isolate position the contact distance between the fixed and moving contacts is greater than said probe dielectric distance, and the contact distance is sufficient dielectric for recurring abnormal high-voltage components.

5. The arrangement according to claim 4, wherein said high-voltage pulse detector includes switching threshold logic means, an antenna, means coupled between said antenna and a first input of the switching threshold logic means for detecting an R.F. signal produced by a high altitude blast to supply an active signal condition at the first input, a sense coil coupled to said power source, over-voltage protection means coupled between the sense coil and a second input of the switching threshold logic means to supply an active signal condition at the second input, wherein said actuator means includes a switch driver electrically coupled from an output of the switching threshold logic means to a solenoid, which provides the mechanical coupling to said moving contact, the high-voltage pulse detector being operative in response to an active signal condition at either the first or the second input to supply a signal at its output to actuate the switch driver and operate the solenoid, wherein the switching threshold logic means further has a third input for manual commands to control the output to the switch driver.

* * * * *